(12) United States Patent
Brown et al.

(10) Patent No.: US 9,906,552 B1
(45) Date of Patent: Feb. 27, 2018

(54) MANAGING SYSTEM LOAD

(71) Applicant: Amazon Technologies, Inc., Reno, NV (US)

(72) Inventors: Nicholas Howard Brown, Seattle, WA (US); Gregory Branchek Roth, Seattle, WA (US); Gregory Alan Rubin, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 38 days.

(21) Appl. No.: 13/766,350

(22) Filed: Feb. 13, 2013

(51) Int. Cl.
*H04L 29/06* (2006.01)

(52) U.S. Cl.
CPC ................ *H04L 63/1458* (2013.01)

(58) Field of Classification Search
USPC ....... 713/167; 726/14, 25, 29; 709/224, 225, 709/226, 229
See application file for complete search history.

(56) References Cited

U.S. PATENT DOCUMENTS

| | | | |
|---|---|---|---|
| 7,143,163 B1 * | 11/2006 | Bleichenbacher et al. | 709/225 |
| 7,197,639 B1 * | 3/2007 | Juels | H04L 63/08 380/277 |
| 7,937,586 B2 * | 5/2011 | Torre et al. | 713/168 |
| 8,001,188 B2 * | 8/2011 | Miyake et al. | 709/205 |
| 2004/0143670 A1 * | 7/2004 | Roychowdhury et al. | 709/229 |
| 2004/0223619 A1 * | 11/2004 | Jablon | 380/277 |
| 2005/0080858 A1 * | 4/2005 | Pessach | 709/206 |
| 2010/0031315 A1 * | 2/2010 | Feng et al. | 726/3 |
| 2010/0235632 A1 * | 9/2010 | Iyengar et al. | 713/166 |

OTHER PUBLICATIONS

Roger Dingledine, et al. "Peer-to-Peer : Harnessing the Power of Disruptive Technologies, Chapter 16. Accountability". O'Reilly Media pub., Mar. 15, 2001, pp. 273-343.*
Adam Black: "Hashcash—A Denial of Service Counter-Measure", Aug. 1, 2002, pp. 1-10, (retrieved from the Internet at: cypherspace.org/adam/hashcash/hashcash.pdf.*
Adam Black: "The Hashcash Proof-of-Work Function", Network Working Group, Internet Draft, Jun. 2003, pp. 1-5.*
Tuomas Aura et al., "DOS-Resistant Authentication With Client Puzzles", Lecture Notes in Computer Science, vol. 2133, 2001, pp. 170-177, Sep. 20, 2001.*

* cited by examiner

*Primary Examiner* — Eleni Shiferaw
*Assistant Examiner* — Paul Callahan
(74) *Attorney, Agent, or Firm* — Davis Wright Tremaine LLP

(57) ABSTRACT

System load, such as load caused by a denial of service attack, is managed by requiring those requesting access to the system to provide proof of work. A system receives, from a requestor, a request for access to the system. Before the request can be processed, the system provides a challenge to the requestor. The requestor obtains a solution to the challenge and provides proof of having obtained the solution. The system verifies the correctness of the solution and, if the correct solution is verified, the system services the request.

35 Claims, 9 Drawing Sheets

MANAGING SYSTEM LOAD

BACKGROUND

Systems accessible through a network, such as the Internet, can be susceptible to overload due to various reasons. In many instances, too many concurrent attempts to access a system can overwhelm a system, causing various adverse effects. Depending on how, if at all, the system is configured to handle such overload conditions, the system may, for example, be unresponsive to additional attempts to access the system and/or cease operating entirely. Sometimes, system overload is caused without ill intention. The popularity of a website or other online service, for instance, may suddenly increase and a system supporting the website or other service may be unable to handle the sudden increase. In many instances, system overload has more nefarious purposes. Denial of service (DoS) attacks, for example, are frequently used by those with political or other activist agendas to damage the ability of a system to serve its intended purpose. Such attacks are often a particularly effective tool for attackers due to the relative ease at which they may be brought compared with the harm that they cause.

BRIEF DESCRIPTION OF THE DRAWINGS

Various embodiments in accordance with the present disclosure will be described with reference to the drawings, in which.

DETAILED DESCRIPTION

Figure 1:
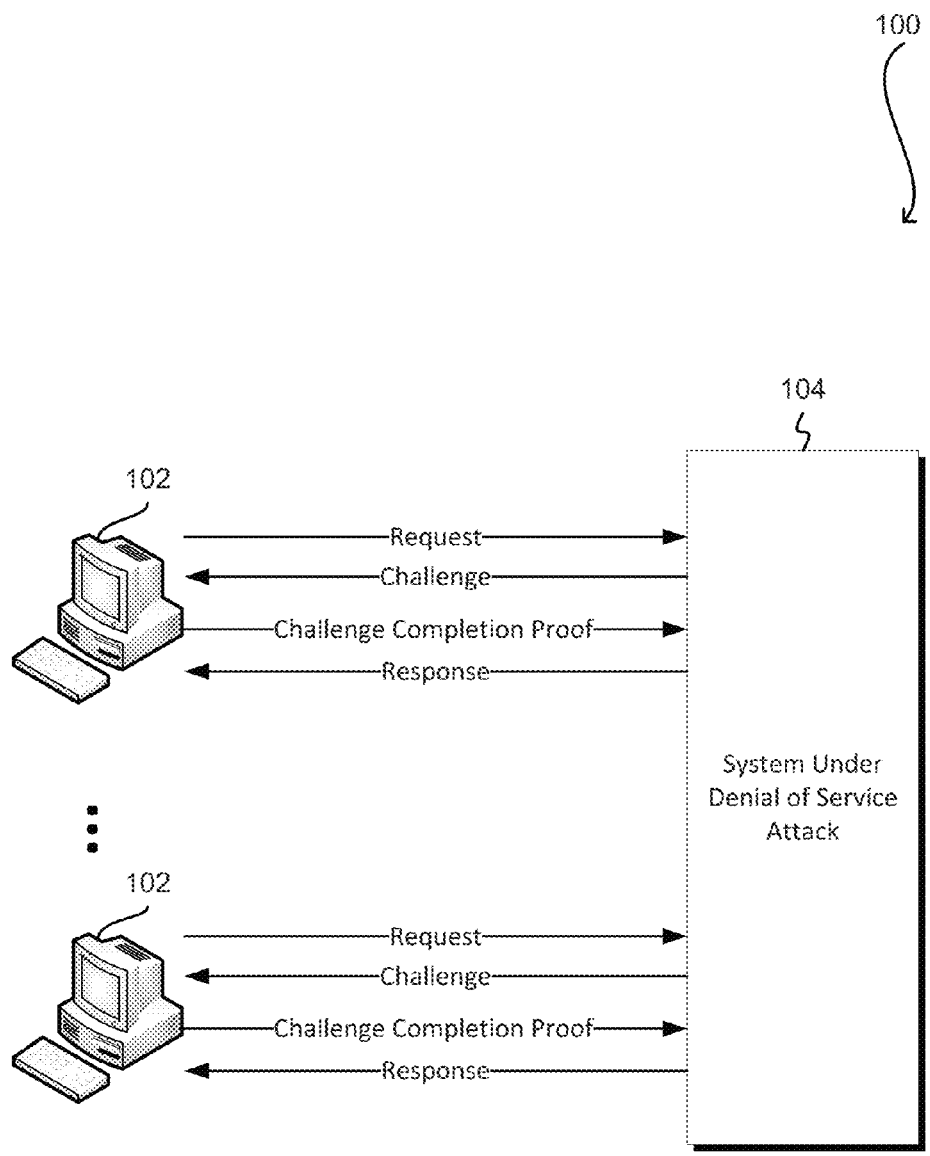
FIG. 1 shows an illustrative example of an environment in which various embodiments of the present disclosure may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments of the present disclosure are directed to managing system load by requiring proof of work. The system load, or at least a portion thereof, may be caused by various reasons including, but not limited to, denial of service (DoS) attacks on the system, although the techniques described herein and variations thereof are applicable in other contexts where system load management may be advantageous. In some embodiments, clients of the system (e.g., devices communicating with the system for the purpose of having the system perform one or more operations) are required to prove completion of one or more challenges before the system will perform operations requested by the clients. Such requirements may be imposed on clients upon detection of network conditions indicative of a DoS attack or other events causing or potentially causing system overload.

In various embodiments, when a client submits a request to the system, the system responds by providing a challenge to the computer system. The challenge can be configured to obviate advantages that make DoS attacks attractive to attackers, such as requests to a system generally requiring less computing resource use than processing the requests by the system. As an example, challenges can be configured such that verification of successful completion of the challenges is computationally easier than successful completion of the challenges. As one example, a challenge may include repeat use of a hash function until output of the hash function has one or more properties (e.g., a specified number of leading zeroes). The hash function may be a cryptographic hash function such as a secure hash algorithm (SHA, such as SHA-1, SHA-2 or SHA-3), message digest algorithm (MD, such as MD5, or MD6), a checksum or error-detection code such as cyclic redundancy check, and the like. Message authentication codes (MACs) such as hash based message authentication code (HMAC), and variations thereof, may also be used. Completion of the challenge may require thousands or even millions of calculations until output satisfying the properties is found. Verification of challenge completion, however, may require relatively few calculations since, if input to the hash function that resulted in the proper output is provided as proof, the hash function needs to only be invoked a single time. As another example, a challenge may include determining a prime factorization of a number. Determination of a number's prime factorization is, generally, computationally more difficult (e.g., requiring a greater number of central processor unit (CPU) cycles) than verifying a prime factorization, which generally requires simple multiplication. It should be noted that, by describing various tasks as computationally easier or more difficult, such terms are intended to describe tasks that are computationally easier or more difficult on average, but not necessarily every time the task is completed. For instance, using the challenge of repetitive invocation of a hash function as an example, there is a small but nonzero probability for most hash functions that output of the hash function satisfying the one or more properties of the challenge may be found after a single invocation of the hash function even though, on average, it would take many more invocations of the hash function. Generally, challenges used in accordance with the various embodiments of the present disclosure may come in various forms. In some embodiments, the challenges involve solving nondeterministic polynomial time (NP) problems or sub-classes thereof.

In various embodiments of the present disclosure, the difficulty of challenges provided to client computer systems is tunable. For example, challenges may be made more difficult as load on a system increases. Similarly, challenges may be made less difficult as load on the system decreases. Difficulty may vary in one or more aspects. For example, in some embodiments, difficulty is varied by varying the number of computations required, on average, to successfully complete challenges. Other types of computing resource usage may also be varied in addition to or instead of varying the computational difficulty. For example, the amount of memory usage required to complete a challenge may be varied. Generally, any type of computing resource usage that may be varied may be used to vary the difficulty of challenges. Other variations are also considered as being within the scope of the present disclosure, including variations discussed below.

FIG. 1 shows an illustrative example of an environment 100 in which various embodiments of the present disclosure may be practiced. As illustrated in FIG. 1, clients 102 communicate with a system 104. Communication between the clients 102 and the system 104 may occur over one or more communication networks, such as the Internet. While not illustrated explicitly in FIG. 1, the system 104 may comprise multiple devices, such as web servers and/or load balancers, and communication of a client 102 with the system 104 may occur through such device of the system 104. As illustrated in FIG. 1, the system 104 may be under a DoS attack, although embodiments of the present disclosure are applicable to other circumstances where the system 104 may be susceptible to overload.

The clients 102 may communicate with the system 104 for various purposes in accordance with the various embodiments. For example, in some embodiments, the system 104 comprises a network of computing devices collectively operating to support a website. Clients 102 may communicate with the system 104 to obtain documents of the website and/or otherwise communicate with the system 104 for services provided through the website. Generally, the system 104 may be any system which is operable to service requests submitted to the system 104 by clients 102. Servicing the requests may include various types of operations including, but not limited to, retrieving from storage and providing documents, obtaining information from one or more databases, writing to one or more databases, communicating with one or more other systems, performing one or more calculations, placing one or more documents in data storage, and the like.

While symbolized in FIG. 1 as personal computers, the clients 102 can be any devices configured to communicate with the system 104 over a network. Example devices include personal computers, notebook computers, tablet computers, mobile communication devices, such as smartphones, electronic book readers and/or other devices configured to transmit requests over a network to the system 104 for processing by the system 104. The clients 102 may also be operated in a variety of contexts. For example, some or all of the clients 102 may be devices of users of the system 104. As an illustrative example, the clients 102 may include devices used by users to access services provided through a website. At least some of the clients 102 may communicate with the system 104 through automated processes, such as clients that have been affected with malware and, as a result of the infection, operate to participate in a DoS attack on the system 104 by submitting requests to the system 104.

As noted above, various embodiments of the present disclosure are directed to management of load on the system 104. For example, during conditions indicative of a DoS attack (e.g., an anomalous increased load on the system 104), various embodiments of the present disclosure allow the system 104 to avoid becoming over loaded with requests from clients 102. As discussed, while the system 104 is illustrated in FIG. 1 as being under a DoS attack, the clients 102 communicating with the system 104 are not necessarily communicating with the system 104 for nefarious purposes. For example, many of the client devices 102 may be communicating with the system 104 for legitimate purposes, such as for causing the system 104 to process legitimately submitted requests. Further, it should be noted that while FIG. 1 illustrates the system 104 as being under a DoS attack, various embodiments of the present disclosure are applicable in other contexts where load on a system may be an issue. For example, in the context of websites, a system may come under increased load due to purposes independent from DoS attacks. As one example, a website may rapidly become more popular. Load on the system 104 may be a result of such sudden increased popularity and, therefore, embodiments of the present disclosure are applicable to managing system load in various contexts which are not limited to DoS attacks. Accordingly, various techniques of the present disclosure are applicable to throttling requests to prevent system overload.

To manage system load, various embodiments of the present disclosure require clients 102 to provide proof of work before corresponding requests are processed. Proof of work may comprise information from which completion of the work is verifiable, examples of which are discussed above and below. In many embodiments, completing the work is more difficult than verifying the work, where difficulty is measurable in terms of computing resource usage, such as CPU cycles, memory usage, network bandwidth, and/or other measurable aspects of computing resource usage. As illustrated in FIG. 1, a client 102 submits an initial request to the system 104. Before servicing the request, the system 104 provides a challenge to the client. The challenge may be provided as code that is executable by the client without the client having to be specifically configured (e.g., preprogrammed) to be able to perform the challenge. For example, the challenge may be provided as a script of an industry standard scripting language, such as JavaScript or ActionScript. In many embodiments, the request from the client 102 is a request for content from the system 104 (e.g., website content). If the client is configured to be able to process the content from the system, the client would also be configured to be able to process the challenge. For example, if the client requests website content that includes JavaScript or ActionScript, the client would be already able to complete a challenge encoded in JavaScript or ActionScript. Further, in various embodiments, the challenge provided to the client 102 may encode or otherwise specify the algorithm the client 102 is to use to complete the challenge, although various embodiments of the present disclosure may provide challenges in other ways. For instance, the challenge may be to compute a number having certain properties, the client being free to use any suitable algorithm for finding a number having the properties.

To have the request successfully processed by the system 104, the client 102 may then complete the challenge, for example, by executing a script that encodes the challenge. Once complete, clients 102 may provide to the system 104 proof that the challenge was completed. The proof that the challenge was completed may comprise information from which successful completion of the challenge can be verified by the system 104. For example, in an embodiment, a challenge 104 may be a challenge to use a function (such as a hash function) to compute a number having certain properties. Client 102 may use the function to compute such a number having the properties and provide proof to the system 104. The proof may, for instance, be input to the function that the client used to obtain the number having the properties. The system 104 may then verify that the input the client used indeed results in a number that has the properties specified by the challenge. As another example, the challenge may be to obtain a prime factorization for a number provided to the client 102 by the system 104. Client 102 may factor the number and provide the prime factorization in the challenge completion proof to the system 104. As evident from the above illustrative examples, in various embodiments, the challenge is configured such that the challenge is computationally easier to verify than to complete. For example, with the example of obtaining a prime factorization of a number, known techniques for factoring numbers are computationally more difficult than multiplication, which may be used to verify a proposed prime factorization.

Once the system 104 verifies that the challenged completion proof indicates the successful completion of the challenge, the system 104 may provide a response to the client 102 to the request that the client 102 initially submitted. In this manner, by requiring proof of work from clients of the system 104, the advantage of attackers in a DoS attack that submitting requests is generally computationally easier than processing the requests can be removed. By making DoS attacks more difficult to sustain, the system 104 is more likely to be able to withstand the DoS attack (or other cause of increased system load) and operate to serve legitimate requests.

Figure 2:
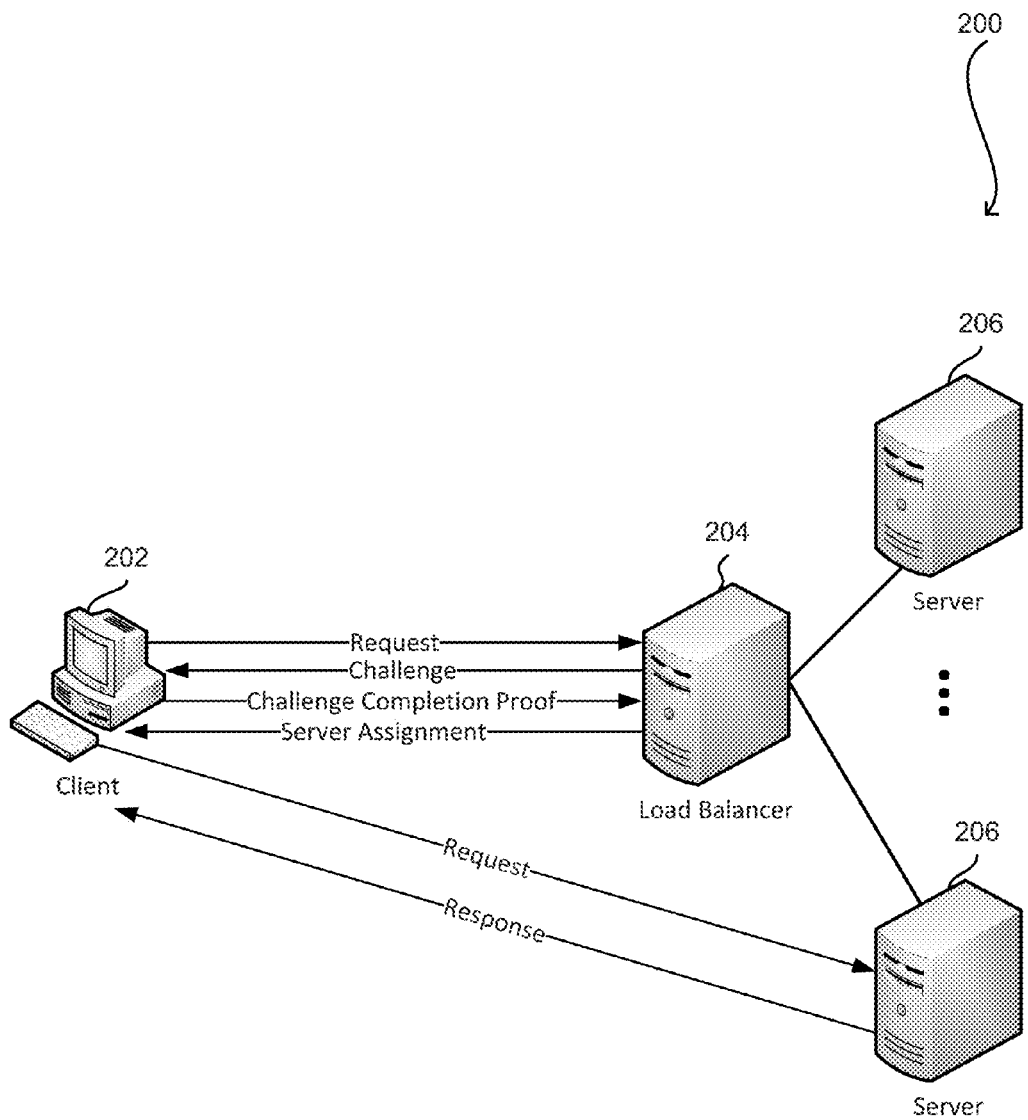
FIG. 2 shows an illustrative example of an environment in which various embodiments of the present disclosure may be practiced.

The techniques described briefly above in connection with FIG. 1 may be utilized in numerous different environments. FIG. 2 shows an illustrative example of an environment 200 in which various embodiments of the present disclosure may be practiced. In the environment 200, a client 202 communicates with a load balancer 204, to ultimately communicate with a server 206 of a cluster of servers 206 whose loads are managed by the load balancer 204. The servers 206 may be in a cluster of servers utilized to manage high system load, such as to manage requests submitted to a website where a single server would be unable to handle all traffic to the website. The load balancer 204 may be a computing device configured to manage the load of the servers 206 using various load balancing techniques. It should be noted that the load balancer 204 may be, but is not necessarily, a load balancer that is operated as a service to a third party. The load balancer 204 and/or the servers 206, for example, may be hosted by a computing resource provider and may be programmatically managed remotely by a customer of the computing resource provider.

In an environment shown in FIG. 2, the client 202 submits a request to the load balancer 204. The request may be submitted to the load balancer 204 in various ways in accordance with various embodiments. For example, in an embodiment, the client 202 may have received as input, such as through typing or selection of an element on a user interface, a uniform resource locator (URL). The client 202 may communicate with a domain name service (DNS) to obtain an IP address corresponding to the URL. The DNS may provide an Internet protocol (IP) address of the load balancer 204. The client 202 may then submit the request to the load balancer 204 using the IP address obtained from the DNS. The load balancer 204, as one way to manage load of the server 206, may be configured to provide a challenge to the client 202 upon receipt of the request. As described above in connection with FIG. 1, the client 202 may complete the challenge and provide proof of completion of the challenge to the load balancer 204.

The load balancer 204 may verify that the challenge completion proof indicates successful completion of the challenge and then may determine a server which the client 202 should communicate. The server 206 may be selected by the load balancer 204 using various load balancing techniques such as random choice, round robin, or more sophisticated techniques that take into account factors such as server load, recent response times, up/down states, number of active connections, geographic location, capabilities, recent assignments, and/or other factors. The load balancer 204 may then transmit a server assignment to the client 202, which may comprise information instructing the client 202 to communicate with a server specified by the server assignment. Specification of the server 206 may include, for example, an IP address of the server 206. The client 202 may then submit the request to the server 206 and receive a response from the server 206. As discussed above, the server 206 may service the request in various ways in accordance with the various embodiments, such as providing documents generating dynamic content, communicating with other services to obtain more information, and the like.

FIG. 2 illustrates one illustrative example of how a load balancer 204 may be used in a network of computing devices although other load balancing techniques are also considered as being within the scope of the present disclosure. For example, in some embodiments, the load balancer 204 may act as a proxy for the servers 206. Instead of providing a server assignment to the client 202, the load balancer 204 may forward the request to a server 206 selected by the load balancer 204. The selected server 206 may provide a response to the request to the load balancer 204, which forwards the response (or information based at least in part on the response) to the client 202. In embodiments where the load balancer 204 acts as a proxy for the servers 206, the device that originates the challenge to the client 202 may vary. For example, one or more of the servers 206 may be configured to provide a challenge to the load balancer 204, which the load balancer 204 forwards to the client 202. Challenge completion proof may be received from the client 202 to the load balancer 204, which may either verify completion of the challenge itself (in some embodiments) or forward the challenge completion proof to a server 206 for verification (such as the server 206 that originated the challenge).

Figure 3:
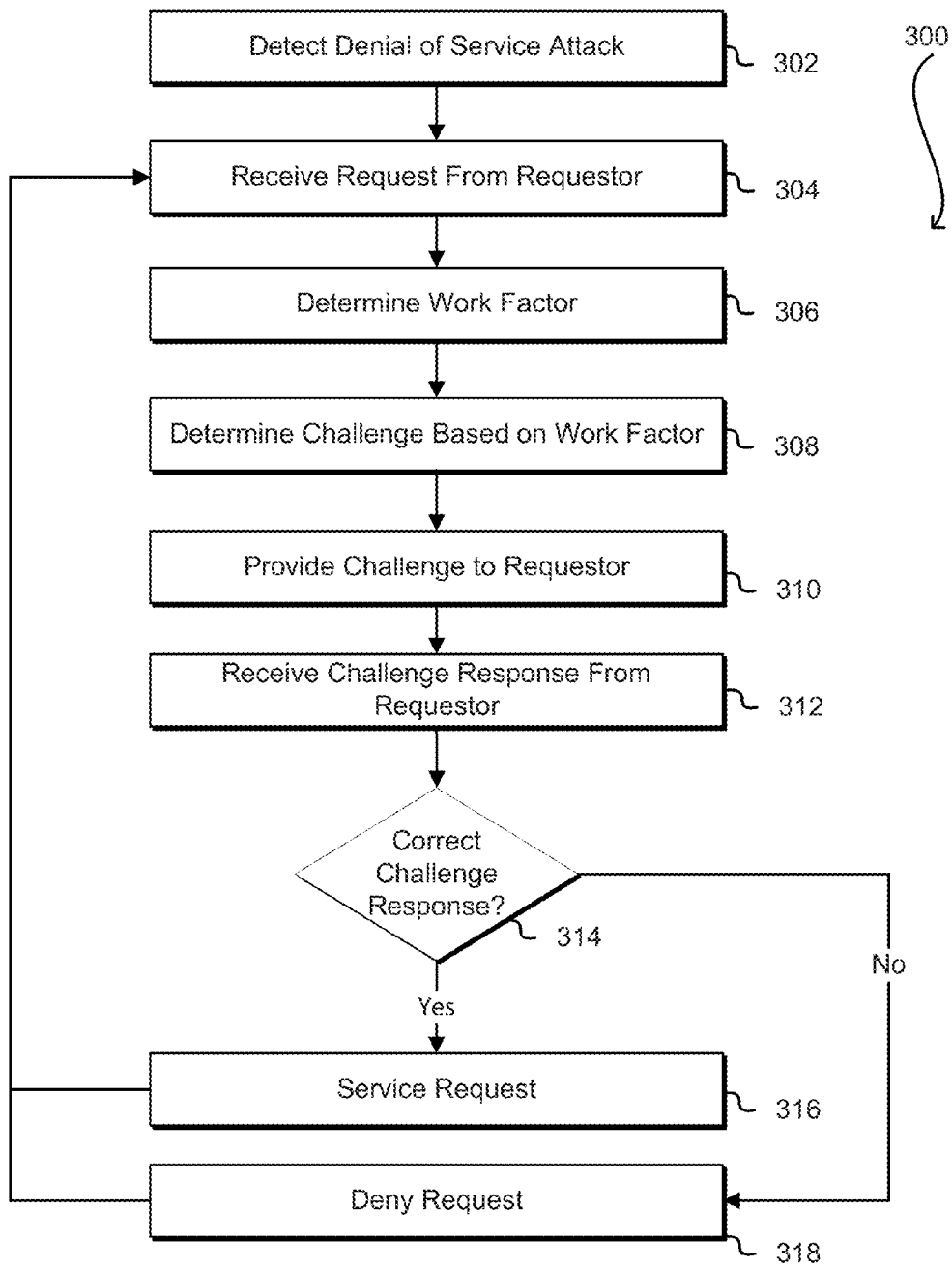
FIG. 3 shows an illustrative example of a process for managing system load in accordance with at least one embodiment.

FIG. 3 shows an illustrative example of a process 300 for managing system load in accordance with various embodiments. The process 300 may be performed by any suitable system, such as the system 104 described above in connection with FIG. 1, or a component of such a system, such as a load balancer, server, or other network appliance that receives requests. Some or all of the process 300 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an embodiment, the process 300 includes detecting 302 a DoS attack. Detecting 302 the DoS attack may be performed in various ways in accordance with various embodiments. For example, detection of a DoS attack may be performed by monitoring system load and detecting the system load passing a particular threshold. The threshold may be measured in various ways and may be based, at least in part, on a number of requests submitted per time period, a number of concurrent connections, or any other measurement of strain on a system. Detecting 302 the DoS attack may be performed in other ways too. For example, in some distributed systems, a device monitoring a system may be used to determine whether a DoS attack is being administered and detecting the DoS attack may include receiving a message from such a monitoring system. Detection of a DoS attack may also be performed by receiving by explicit user input (e.g., from a system administrator) indicating a DoS attack.

The process 300 in an embodiment includes receiving 304 a request from a requestor. Receiving the request may, for example, include receiving over a network a request from the client, such as the clients described above in connection with FIGS. 1 and 2. The request may be any request to be serviced by a system performing the process 300 or otherwise operating in connection with the device performing the process 300. Upon receipt of the request, the process 300 may include determining 306 a work factor. A work factor may be a parameter used for challenges to be provided, such as described above. For example, in some embodiments, challenges may include repeated invocation of a hash function until an output of the hash function has particular properties, such as a specified number of leading zeros. The work factor may be the number of leading zeros. Generally, the work factor may be any parameter which is tunable to make the challenges easier or more difficult to compute. Further, the work factor does not necessarily need to be a parameter of the problem to be solved (e.g., a number of leading zeroes), but may be used to select problems of varying difficulty. For instance, the work factor may be selected from a plurality of work factors comprising "easy," "medium," and "hard." Challenges may be assigned one of these categories according to their difficulty. As noted, difficulty may be measured in any suitable measurement of computing resources, such as central processing unit (CPU) cycles, memory usage and/or other measurements of competing resources.

Once the work factor has been determined 306, the process 300 may include determining 308 a challenge based, at least in part, on the work factor. Once the challenge has been determined 308, the process 300 may include providing 310 challenge to the requestor. The challenge may be provided to the requestor in any suitable manner. For example, in some embodiments, the challenge is provided in a manner that does not require modification to the client. For example, the challenge may be provided as code executable by the client in accordance with one or more industry standards. For example, the challenge may be encoded as a script, where the script may be generated according to JavaScript, ActionScript, or any other industry standard scripting language. In such embodiments, providing 310 the challenge to the requestor may include providing a script that encodes executable instructions for completing the challenge. The requestor may then complete the challenge and may submit a challenge response.

Accordingly, the process 300 includes receiving a challenge response from the requestor. The challenge response may comprise proof that the challenge has been completed. Generally, the challenge response may include any information from which successful completion of the challenge is verifiable. The process 300, accordingly, includes determining 314 whether the challenge response is correct. Determining whether the challenge response is correct can be done in various ways in accordance with the various embodiments. For example, verifying whether the challenge response is correct may include calculating, based at least in part on the challenge response, one or more values and checking the calculated one or more values to determine if the one or more values have properties specified by the challenge. In many embodiments, challenge responses are sent according to applications that communicate according to a protocol (e.g., hypertext transfer protocol (HTTP)) of an application layer of a networking model, such as an Open Systems Interconnection (OSI) or Transmission Control Protocol and Internet Protocol (TCP/IP) model. Challenge responses may be received and verified by an application that receives the challenge response according to the protocol of the application layer. Challenge response and verification, however, may occur at different layers of a networking model.

For example, challenge responses may be provided according to a protocol of the application layer of a networking model but verified at a lower layer of the networking model. For instance, a challenge may be configured such that, proof of completion of the challenge transmitted over a network transmitted using one protocol is verifiable according to another protocol, without requiring translation between the protocols. For example, as noted above, instructions for completing a challenge may be encoded according to a script transmitted to a client. Proof of completion of the challenge by the client may be transmitted by the client according to a higher level protocol (e.g., a protocol in the application layer of the TCP/IP stack), but verified at a lower level in the stack, e.g., by checking that sequences of bits transmitted over a network satisfy one or more conditions that are mathematically equivalent to conditions of the challenge encoded in the script. As one specific example, a number having certain properties at the application layer of the TCP/IP stack will produce a sequence of bits having certain properties at a lower level of the stack and such properties at the lower level can be used for verification. Accordingly, an application or other programming module may transmit data according to a protocol in the application layer of the TCP/IP stack, but an application or other programming module may receive data according to a protocol in a lower level in the stack and verify the data accordingly.

Figure 4:
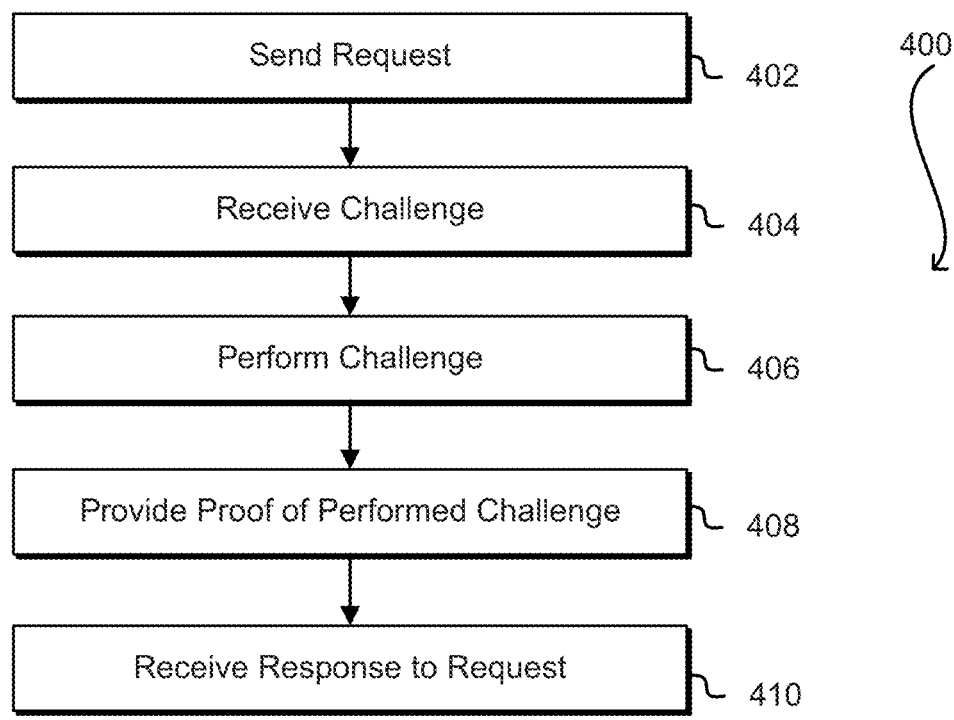
FIG. 4 shows an illustrative example of a process for accessing a system, in accordance with at least one embodiment.

If determined 314 that the challenge response is correct, that is the challenge response indicates successful completion of the challenge, the process 300 may include servicing 316 the request. If it is determined 314 that the challenge response is incorrect, that is, the challenge response does not indicate successful completion of the challenge, the process 300 may include denying 318 the request. Denying the request may be performed in any suitable manner. For example, denying 318 the request may be performed by simply doing nothing; that is, not providing a response to the request, not servicing the request and/or not taking any additional action. Denying the request may include taking additional action, such as providing messages to the requestor indicating denial of the request. Generally, the request may be denied 318 in any suitable manner FIG. 4 shows an illustrative example of a process 400 for communicating with a system that implements various embodiments of the present disclosure. The process 400 may be performed by any suitable device, such as by a client device 102 described above. In an embodiment, the process includes sending 402 a request. The request may be sent in any suitable manner and in accordance with any suitable protocol, such as protocols discussed below. The request may be sent to a system operable to process the request, that is, to service the request. Sending the request may be performed in any suitable manner and may include communication with a DNS or other system, such as described above. The process 400 in an embodiment includes receiving 404 a challenge. The challenge may be received 404, for example, from the system to which the request was submitted. The challenge may be encoded in an instruction executable by the device performing the process 400. For example, the challenge may be received as a script according to an industry standard scripting language, such as JavaScript or ActionScript. It should be noted, however, that the challenges may be encoded in other ways. For instance, clients may be programmed to compute challenges and sending the challenge may be performed by sending parameters for the challenges. Accordingly, in an embodiment, the process 400 includes performing 406 the challenge. Performing the challenge may include performing one or more operations until an intended challenge has been successfully completed, such as by generating information which satisfies one or more conditions specified by the challenge. Once the challenge has been performed 406, process 400 includes providing 408 proof of having performed the challenge. The proof may be provided in any suitable manner and generally may include information from which the performance of the challenge may be verified. Having provided 408 proof of the performed challenge, the process 400 may include receiving 410 a response to the request. The response may be information requested in the request and/or an acknowledgment that one or more operations have been performed by the system to which the request was submitted. Information received in a response may be have been obtained from data storage or it may have been generated dynamically by the system to which the request was submitted. Generally, the types of responses may vary in accordance with the various embodiments.

Figure 5:
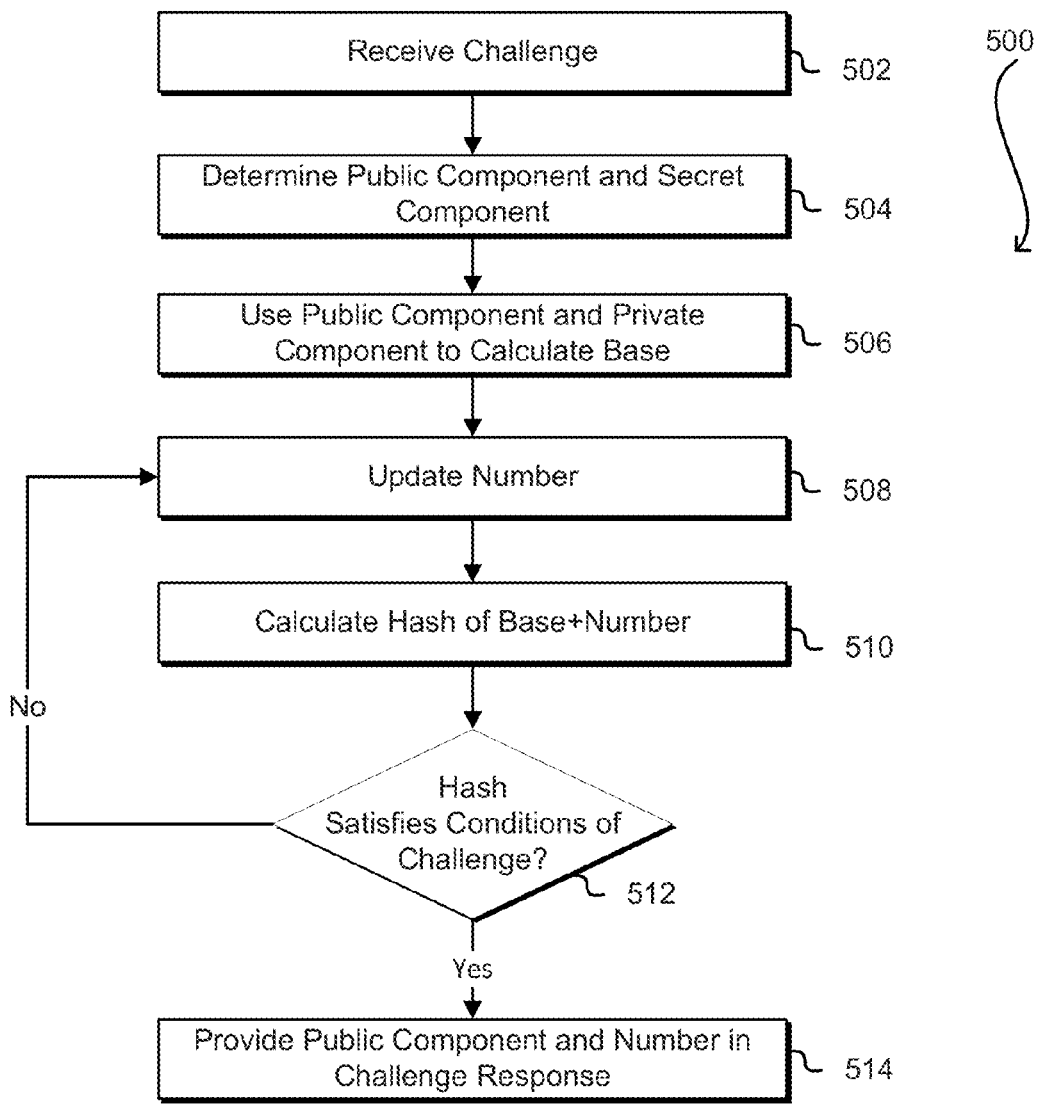
FIG. 5 shows an illustrative example of a process for providing proof of work, in accordance with at least one embodiment.

FIG. 5 shows an illustrative example of a process 500 for completing a challenge in accordance with the various embodiments. In this illustrative example, the process 500 is used to perform a challenge of identifying a hash collision (i.e., determining input to a hash function that produces output that satisfies one or more criteria). The process 500 may be performed as part of the process 400 described above in connection with FIG. 4 and, in particular, in connection with receiving 404 and performing 406 the challenge and providing 408 proof of the performed challenge. Executable instructions for performing the process 500, or variations thereof, may be provided to a client computer system, such as in JavaScript, ActionScript, and/or another industry standard script or in any other manner. In an embodiment, the process 500 includes receiving 502 a challenge such as described above. Upon receipt of the challenge, a public component and secret component may be determined. The public component may be information that is not protected as a secret. It should be noted that the public component is not necessarily publicly available. Example public components may include information such as a timestamp, a cryptographic nonce (which may have been obtained from the server that provided the challenge to the device performing the process 500), a username, and/or other information which is not maintained as a secret. The public component may comprise numerous sub-components. For example, an example public component may comprise the concatenation of a timestamp, cryptographic nonce and a username. The secret component may comprise information that is maintained as a secret. For example, the secret component may not be transmitted in plaintext form over a network (if at all) and may be otherwise protected by one or more security measures. Example information that may comprise a secret component includes a password of a user account with the system to which the process 500 is being performed to access. As with the public component, the secret component may comprise multiple sub-components. The secret may be a secret shared with a device that verifies completion of the challenge of the process 500, although secrets used in accordance with the various embodiments are not necessarily shared secrets but, on the other hand, may be, as an example, a private key of public key-private key pair for a public key algorithm where verification of completion of a challenge is verifiable using the public key of the pair.

Returning to the illustrative example of FIG. 5, the public component and secret component may then be used 506 to calculate a base. The base may be a value that is generated based at least in part on the public component and the secret component. For example, the base value may comprise a concatenation of the public component and the secret component, although other ways of generating the base value based at least in part on the public component and secret component may be used.

The process 500 may include updating 508 a number. The number, as described below may be a number used as input to a hash function. Updating 508, the number may be performed in various ways in accordance with various embodiments. For example, updating the number may include generating a random or pseudo random number using an appropriate random or pseudo random number generator. An updated number may also include updating the number in a sequence of numbers, such as by incrementing the number by a predetermined amount, such as one. Generally, a number may be updated in any suitable manner. The process 500 in an embodiment includes calculating 510 a hash of the base concatenated with the number (or, in other embodiments, another value based at least in part on the base and the number). A determination may then be made 512 whether the calculated hash satisfies one or more conditions specified by the challenge. If it is determined 512 that the calculated hash satisfies the one or more conditions of the challenge, the process 500 may include providing the public component and number in a response to the challenge; that is, providing public component and number as proof or at least a portion of proof that the challenge has been completed successfully. A system verifying that the challenge has been completed successfully may utilize the secret information to generate the base and calculate a hash of the base concatenated with the number. For example, the system verifying that the challenge has been completed successfully may use the secret information to generate the base, calculate the hash of the base concatenated with the number, and verify that the hash satisfies the conditions specified by the challenge.

If it is determined 512 that the calculated hash does not satisfy the one or more conditions of the challenge, the process 500 may include updating 508 the number. The process 500 may then repeat, such as described above and illustrated in FIG. 5. That is, the number may be updated and the hash of the base concatenated with the updated number may be calculated and used as proof of completion of the challenge if the calculated hash satisfies one or more conditions specified by the challenge. The process may repeat until a calculated hash satisfies one or more conditions of the challenge and an appropriate challenge response is provided 514.

Figure 6:
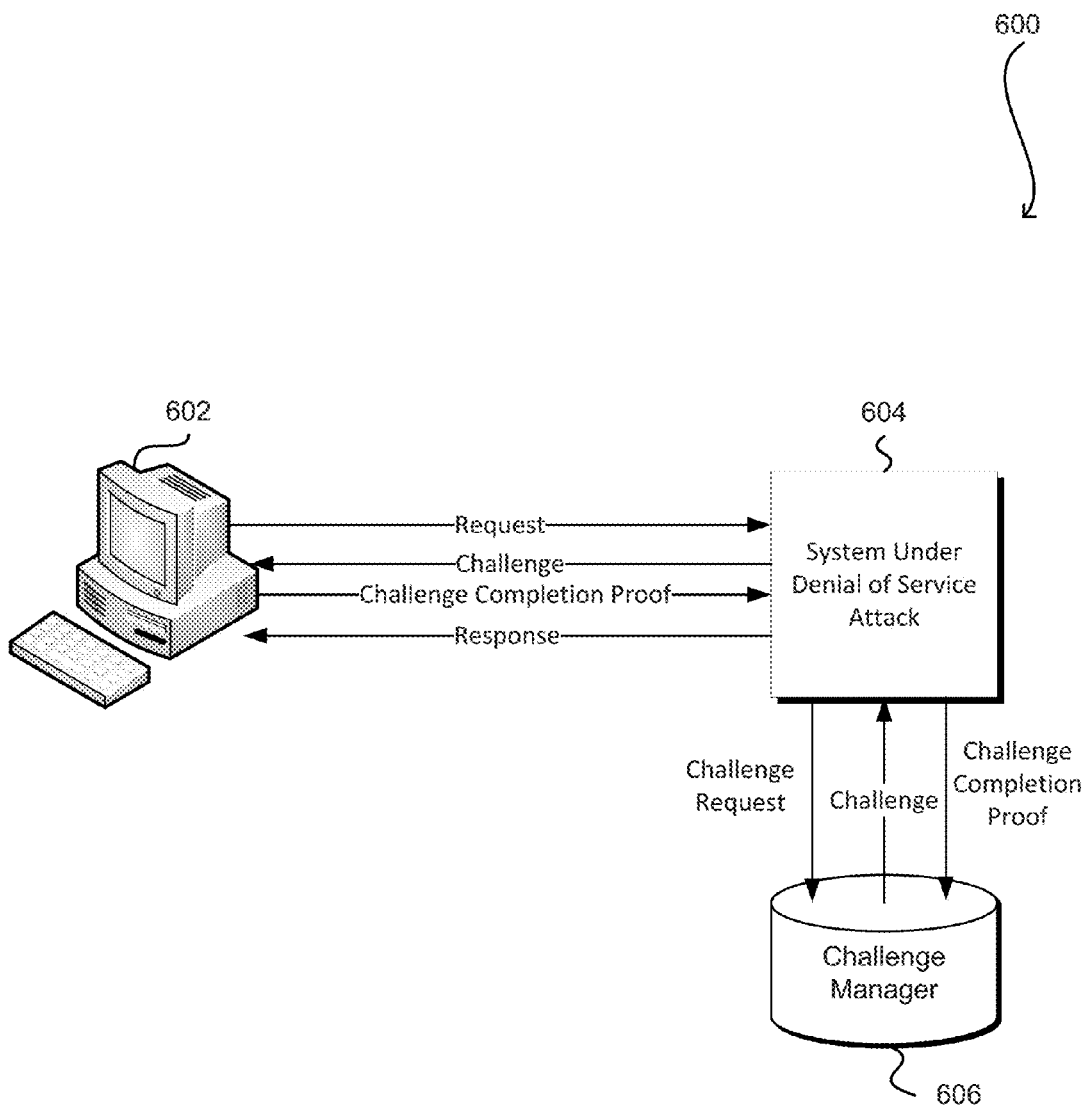
FIG. 6 shows an illustrative example of an environment in which various embodiments of the present disclosure may be practiced.

Various embodiments of the present disclosure allow for work to be done by client computer systems to be collected and used for various purposes. Generally, an entity may need computational work done for various purposes. As one example, an entity may wish to maintain a database of prime factorizations for various numbers. Various embodiments of the present disclosure allow for the work to be distributed among client computer systems attempting to have requests serviced. FIG. 6, accordingly, shows an illustrative example of an environment 600 in which various embodiments of the present disclosure may be practiced. In the environment 600, a client computer system 602 communicates with a system 604 which may be under a DoS attack. The client computer system 602 and system 604 may be as described above. Accordingly, as discussed above, the client 602 may submit a request to the system 604, which may provide a challenge to the client 602. The client may complete the challenge and provide proof of such to the system 604 which, if the proof is sufficient, that is, indicates successful completion of the challenge, the system 604 may provide a response to the client.

In the environment 600, however, the system 604 communicates with a challenge manager system 606. The challenge manager system 606 (challenge manager 606) may be a system that operates, at least in part, to maintain a database of challenges and proof or other information obtained from successful completion of the challenges (e.g., information of a solution to a problem). The system 604 and challenge manager system 606 may be systems of a single entity or may be systems of different entities. As one example, an entity that hosts, operates, or otherwise manages the system 604 may provide computational work done as a service to a system that provides the challenges 606. The entity that manages the system 604 may provide such computational work as a service and have the computational work performed by clients 602. As illustrated in FIG. 6, the system 604 may submit a request for a challenge to the challenge manager 606 which may provide a challenge in response. When a client 602 has provided challenge completion proof that indicates successful completion of the challenge, the system 604 may provide the proof to the challenge manager system 606 for system storage and/or use.

It should be noted that numerous variations of the environment 600 and the flow of information illustrated therein are considered as being within the scope of the present disclosure. For example, as illustrated in FIG. 6, the system 604 requests a challenge from the challenge manager system 606 upon receipt of a request from the client 602. The system 604, upon receipt of the challenge from the challenge manager system 606, then provides the received challenge to the client 602. In this manner, the challenge manager system 606 provides challenges to the system 604 as needed. The challenge manager system 606 may, however, provide challenges to the system 604 in a batch process. Challenges may be provided from the challenge manager system 606 to the system 604 with or without a request for such challenges. For instance, an administrator of the challenge manager system 606 may simply use the challenge manager system 606 to upload challenges to the system 604. Other variations are also considered as being within the scope of the present disclosure.

Figure 7:
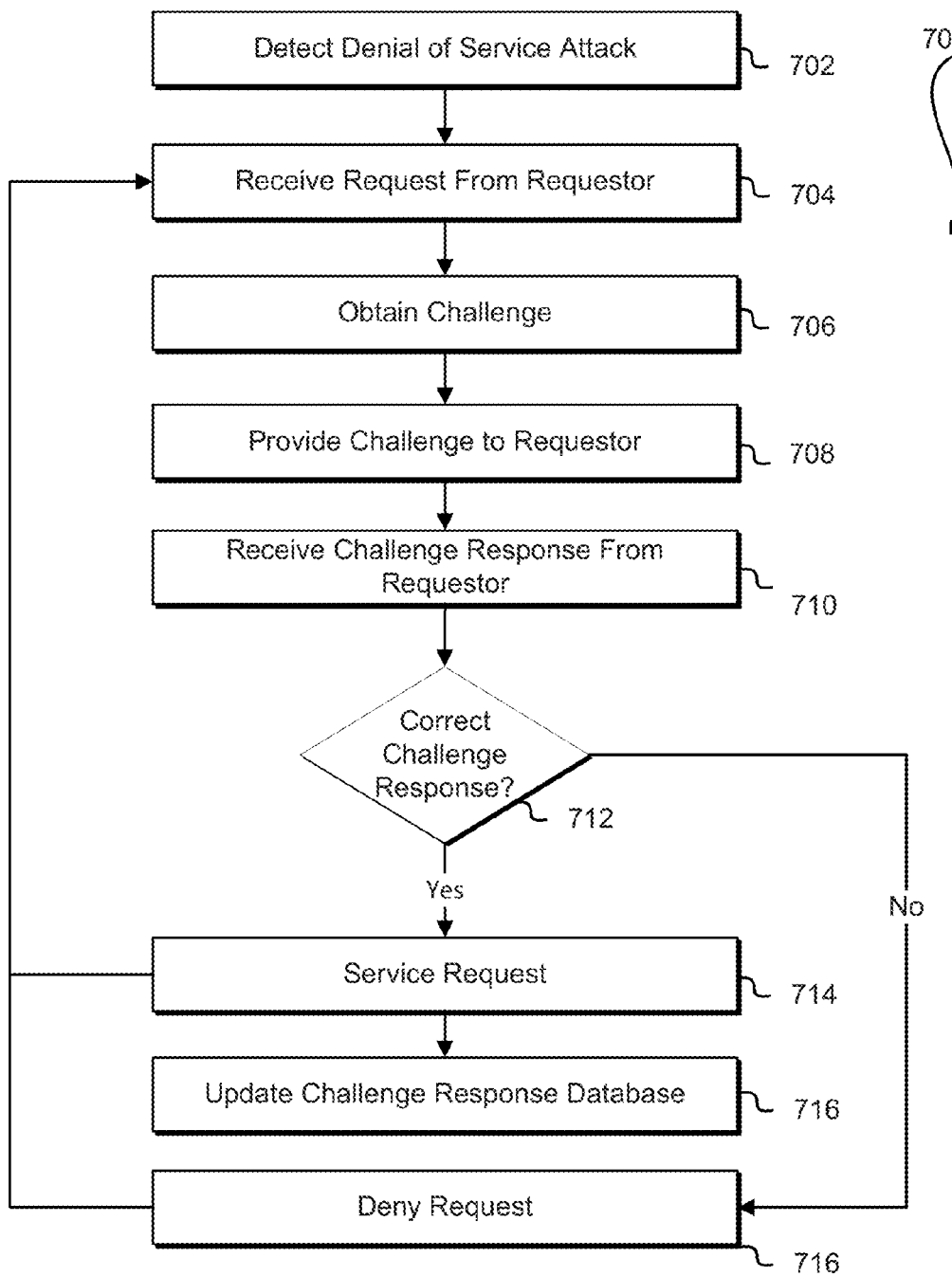
FIG. 7 shows an illustrative example of a process for obtaining computational results, in accordance with at least one embodiment.

FIG. 7 shows an illustrative example of a process 700 for managing system load in accordance with various embodiments. The process 700 may be performed by any suitable system, such as the system 604 described above in connection with FIG. 6. In an embodiment, the process 700 includes detecting 702 a DoS attacks, such as described above. For example, detection 702 of the DoS attack may be performed by monitoring network conditions in a network in which the system performing the process 700 is situated. Detecting the denial of the service attack may also include other operations, such as receiving an electronic communication that indicates the DoS attack. As with all processes and environments described herein, while FIG. 7 is illustrated in connection with DoS attacks, variations of the process 700 may be used for the more general purpose of managing system load where requests provided to the system are not necessarily provided nefariously.

Returning to the description of FIG. 7, in an embodiment, the process 700 includes receiving 704 a request from a requestor, such as described above. Upon receipt 704 of the request from requestor, the process 700 may include obtaining 706 a challenge. Obtaining 706, the challenge may be performed in any suitable manner. For example, in some embodiments, the challenge may be obtained by accessing the challenge from a local data store. The challenge may be obtained in other ways, such as by requesting another system for the challenge, such as from a challenge manager 606 described above in connection with FIG. 6. As yet another example, obtaining the challenge may include generating the challenge. The challenge may be generated, for example, from a template with information ceded or otherwise input into the template. A work factor, for example, may be input into the template to determine how difficult the challenge should be. The challenge may be then generated based, at least in part, on the work factor.

Once a challenge has been obtained 706, the process 700 includes providing 708 the challenge to the requestor. The challenge may be, for example, encoded in a script and transmitted to the requestor over a network. The requestor may then complete the challenge and provide proof of having completed the challenge, such as described above. Accordingly, the process 700 in an embodiment includes receiving 710 a challenge response from the requestor. A determination may then be made 712 whether the challenge response indicates that the challenge has been completed correctly. Determining the challenge has been performed correctly may be performed in any suitable manner, such as described above, and in accordance with variations of the various embodiments described herein. If determined 712 that the challenge response indicates successful completion of the challenge, the process 700 may include servicing 714 the request, such as described above.

Further, if determined 712 that the challenge response indicates successful completion of the challenge, the process 700 may include updating 716 a challenge response database. Updating the challenge response database may be performed in any suitable manner. For example, the database may include challenges and indications whether the challenges have been completed. Once completed, the challenges may be marked as completed and challenge responses may be stored in association with their challenges. In this manner, the completed challenges may be used for other purposes. If it is determined 712 that the challenge response does not indicate successful completion of the challenge, the process 700 may include denying 716 the request, such as described above. As with other processes described herein, portions of the process 700 or the complete process 700 may be repeated. For example, as illustrated in FIG. 7, portions of the process 700 may repeat as other requests are received to a system performing the process 700.

As noted, embodiments of the present disclosure allow for the distribution of work to requestors submitting requests to computer systems where the results of the work done are, for some set of reasons, useful to another entity, such as the entity providing the work to the requestors. The types of work that can be distributed to requestors using the techniques of the present disclosure include any type of work that is computationally intensive and that may be impractical to do by a single entity. As discussed, factorization of large numbers can be performed in a distributed manner by requestors to a computer system, although embodiments of the present disclosure are not limited to such work. For example, solutions to specific instances of the traveling salesman problem and similar problems may be found by distributing work to requestors. Such work may be useful, for instance, to determine optimal delivery truck routings. Generally, any problem that can be solved by distributing work to multiple computer systems may be adapted to be used in connection with various techniques of the present disclosure.

In some embodiments, a system to which requests are submitted operates a service to customers and that charges a fee for use of the service. The service may include, for instance, streaming or otherwise providing digital media. The amount of the fee may be modified based at least in part on the amount of work done by devices of the customers. For example, a customer may be provided digital content for a reduced price (per instance of media or subscription price, e.g.) if the customer's device(s) perform(s) work in response to requests submitted by the customer's device(s). The more work done, the lower the cost to the customer may be.

In some embodiments, homomorphic encryption may be used to avoid providing access to sensitive data to requestors. For example, sensitive data may be encrypted using a homomorphic encryption scheme. A challenge may be provided to a requestor based at least in part on the encrypted data. Upon completion of the challenge, the result may be decrypted. In this manner, the requestor completes the challenge and provides a useful result that is based on the sensitive data without ever having access to the sensitive data or the meaning behind the result that was calculated. The encryption scheme used in such embodiments may vary according to the type of challenge and the type of operation for which homomorphic computation is desired. For example, some cryptosystems are useful for addition while others are useful for multiplication. Example cryptosystems that allow for homomorphic encryption with respect to an operation include, but are not limited to, the Unpadded RSA, the ElGamal, Goldwasser-Micali, Benaloh, Paillier, Okamoto-Uchiyama, Naccache-Stern, Damgard-Jurik, and Boneh-Goh-Nissim cryptosystems. If homomorphic computation for multiple operation types are desired, fully homomorphic encryption cryptosystems, e.g. Gentry's Fully Homomorphic Encryption Scheme, may be used in various embodiments.

Figure 8:
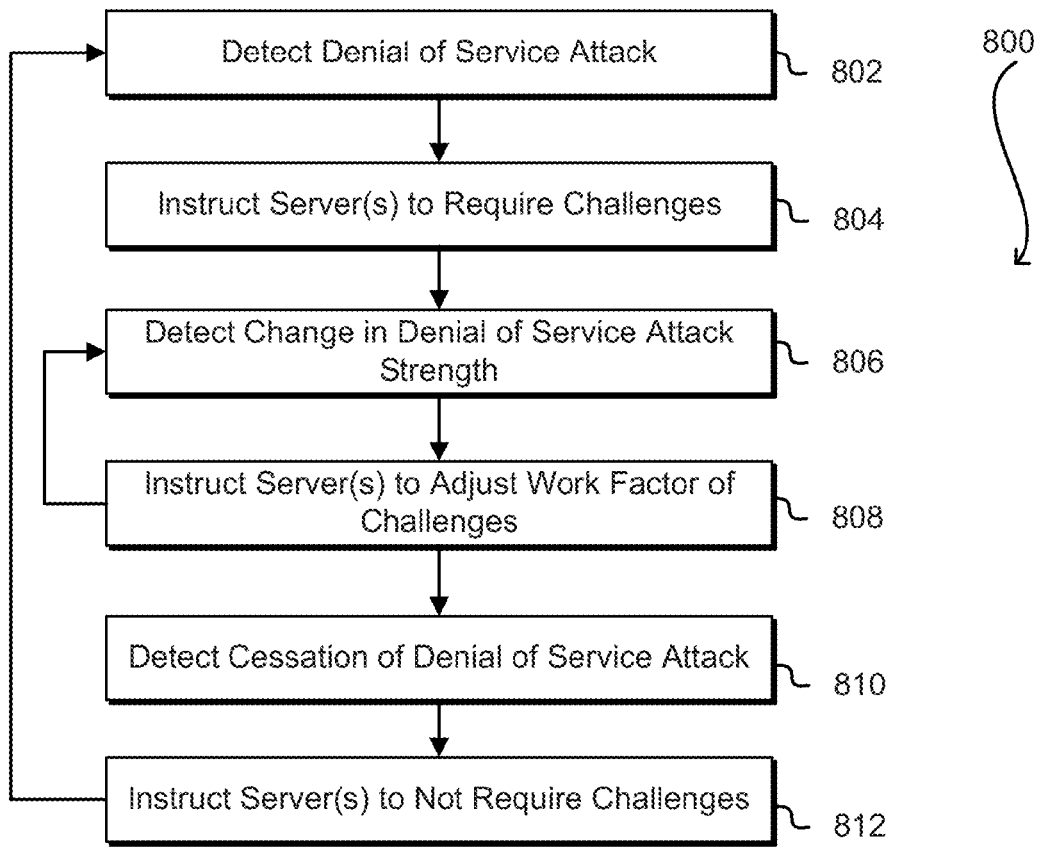
FIG. 8 shows an illustrative example of a process for managing system load, in accordance with at least one embodiment.

As noted above, various embodiments of the present disclosure allow for the tunability of the difficulty of challenges used to manage system load. FIG. 8, accordingly, shows an illustrative example of a process 800 which may be used to provide challenges with variable difficulty in accordance with various embodiments. The process 800 may be performed by any suitable systems, such as a system 104 described above in connection with FIG. 1 and other systems. It should be noted that the process 800 may be performed by a system that does not necessarily process requests from clients such as described above, but that operates in connection with such systems that process requests from clients. In an embodiment, the process 800 includes detecting 802 a DoS attack, such as described above. As above, detection may be performed automatically or as a result of receipt of user input. The process 800, in addition, includes instructing 804 one or more servers to require challenges. Instructing 804 the servers to require challenges may be performed by transmitting electronic messages to the servers that instruct the servers to reconfigure to provide challenges upon receipt of requests, such as described above. It should be noted that the servers that are provided the instructions may vary in accordance with the various embodiments. For example, in some embodiments, the servers that are instructed are the servers that process the request. In other embodiments, the servers do not directly process the request, but are involved in their processing. For example, the servers to which the instructions are sent may be a load balancer, such as described above.

Continuing with FIG. 8, the process 800 in an embodiment includes detecting 806 a change in the DoS attack strength. Detecting a change in DoS attack strength may be performed in any suitable manner, such as a manner in which the DoS attack is detected in the first place. The change in strength may be detected based at least in part on one or more measurements of network performance, such as requests per time period and/or concurrent connections. Accordingly, in an embodiment, the process 800 includes instructing 808 one or more servers to adjust a work factor for the challenges. Adjusting the work factor may be performed in any suitable manner and may be performed in accordance with which the change of DoS attack strength was detected 806. For example, if it is detected 806 that the DoS attack is increasing in strength, the service may be instructed 808 to adjust the work factor so that the challenges are computationally or otherwise more difficult. Similarly, if it is detected 806 that the DoS attack strength as decreased, then the service may be instructed to adjust the work factor such that challenges are computationally or otherwise easier.

The process of detecting changes in the DoS attack strength and instructing the servers to adjust work factor as illustrated in FIG. 8 may be repeated as the DoS attack proceeds. At some point, the process 800, as illustrated in FIG. 8, includes detecting 810 cessation of the DoS attack. It should be noted that detection of DoS attack cessation may be performed in various ways and that detecting the cessation may occur despite the attack ongoing occurrence. For example, detecting cessation of the DoS attack may occur as a result of the strength of attack, decreasing past a predetermined threshold, where the threshold may be measured in accordance with how the strength of the service attack is measured. Thus, the attack may still be occurring, just not at a level which may significantly adversely affect a system. Upon detection 810 of cessation of the DoS attack, the process 800 may include instructing 812 one or more servers to not require challenges. Thus, the servers may process the requests without requiring proof of work from the clients that submitted the requests. As indicated in FIG. 8, this process 800 may repeat as DoS attacks are subsequently detected.

As noted above, numerous variations are considered as being within the scope of present disclosure. For example, various embodiments of the present disclosure are described above in connection with a DoS attack. As noted, variations of the techniques described herein may be used to generally manage system load which may vary for purposes which are not necessarily nefarious. The process 800, for example, may be modified to tune challenge difficulty with respect to general changes to system load that are not necessarily due to or identified as being associated with a DoS attack. Further, examples that do describe explicitly DoS attacks are described in connection with a single DoS attack, but the techniques are equally applicable when multiple DoS attacks are administered concurrently.

In addition to the above, various enhancements may also be made in accordance with the various embodiments. For example, when a client submits a request to a server and as a result is required to submit proof of work, the client may not be required to submit proof of work for subsequent requests. For example, the client may establish a connection with a server. As part of that process, the client may be required to successfully complete a challenge. Upon successful completion of the challenge, a server may not require from the client subsequent proof of work. Cookies or other techniques may be used to track which clients have successfully provided proof of work. The period for which additional proof of work may be not required may be, for example, for the duration of a session or for a predetermined amount of time or otherwise. In this manner, any delay in request processing caused by the necessity of completing a challenge may be from the client's perspective a single event and request processing may occur more smoothly for successive requests. As another example, FIG. 8 describes one embodiment where servers are instructed to vary the difficulty of challenges in accordance with load on a system. Servers may be programmed to adjust the difficulty themselves in accordance with their own individual loads.

Further, various embodiments of the present disclosure are provided for the purpose of illustration and numerous variations are considered as being within the scope of the present disclosure. For example, in some embodiments, challenges are generated based at least in part on associated requests. As one illustrative example, requests may include electronic signatures. A request from a client with a signature generated by the client may be used to seed a random number generator to generate a random number for the client to factor into prime numbers. The signature may also be used as input into a hash function for challenges that involve identifying hash collisions. Generally, other ways in which requests or portions thereof can be incorporated into requests may be used to generate challenges. Basing challenges at least in part on requests provides numerous technical advantages. For example, requests often are generated based at least in part on a timestamp, which prevents clients involved in nefarious purposes (e.g., DoS attacks) from pre-generating challenge responses.

Other variations of the present disclosure include variations by servers involved in utilizing the various techniques described herein. For example, in some embodiments, servers prioritize requests in which the client has chosen (e.g., programmatically determined) to do more work (e.g., more difficult challenges or more challenges). Further, in some embodiments, servers adjust fees to clients (i.e., to accounts associated with clients) based at least in part on the amount of work client's present. As yet another example, challenges may be determined based at least in part on one or more characteristics of client devices. For instance, devices submitting requests to a system may vary in capabilities. For instance, mobile computing devices (e.g., smartphones, tablet computers, and/or electronic book readers) may have less computational or other abilities than desktop or other computers. Thus, a characteristic may be a computational or other ability or something that corresponds to a computational or other ability, such as device type. If characteristics are able to be ascertained (e.g., from requests themselves and/or from a database), challenges may be determined accordingly. In this manner, for instance, challenges may be provided to mobile devices that are less likely to unduly consume battery power than challenges provided to other devices. Similarly, challenges may be provided to at least some devices of varying capabilities so that the devices are able to complete the challenges in approximately the same amount of time, regardless of their variations in computational ability. Generally, challenges are able to be provided in a manner tailored to the devices' characteristics.

Characteristics of requestors may also be used to select which requestors receive challenges. For example, one or more characteristics of a requestor may indicate an elevated probability of the requestor participating in a DoS attack as opposed to submitting a request for a legitimate purpose. Such characteristics may be based at least in part on Internet Protocol (IP) addresses from which the requests originate. For example, if an IP address of a requestor indicates that the requestor is submitting the request from a geographic region known to be associated with a DoS attack, the requestor may be provided a challenge to complete while IP addresses indicating requests sent from other geographic regions may not receive challenges. Similarly, if determinable due to request characteristics, such as a user-agent indicator (which may be, e.g., sent with an HTTP request), that the request is sent from or likely to have been sent from a client or browser application participating in a DoS attack, a challenge may be provided whereas other requests may not receive challenges in response.

In addition to the above, various embodiments of the present disclosure show particular environments for the purpose of illustration and numerous variations are considered as being within the scope of the present disclosure. For instance, as noted, requests may include signatures that are verified by a system to which access is requested. The techniques described herein may be utilized by distinct devices or network locations that are independent of the device that verifies the signature. In many embodiments, verifying the proof of work is computationally or otherwise cheaper (i.e., easier) than verification of the signature and/or policy associated with a request. Therefore, a request may be denied before more computationally expensive work is completed by the system to which access is requested. Such technical advantages are achieved even when the proof of work verification is performed at the same location and/or on the same device.

As noted above, many techniques described herein are applicable to computing resources operated as a service to customers of a computing resource provider. Server computer systems, including load balancers, may be hosted by the computing resource provider and programmatically managed by customers of the computing resource provider (or by entities that manage the computing resources on behalf of the customers of the computing resource provider). As one example, a customer of a computing resource provider may utilize one or more computing resources of the computing resource provider to support a website of the customer. DoS mitigation may be provided as a service to customers of a computing resource provider and the customer may be charged in various ways, if at all. For example, customers may be charged per challenge, per bandwidth providing challenges and receiving responses to the challenges takes, and/or in other ways. Further, the ability to provide challenges and various aspects of the challenges (e.g., work factor) may be programmatically managed via an application programming interface (API) provided by the computing resource provider. Customers may make API calls to configure whether and/or how challenges are provided. Other variations are also considered as being within the scope of the present disclosure.

Figure 9:
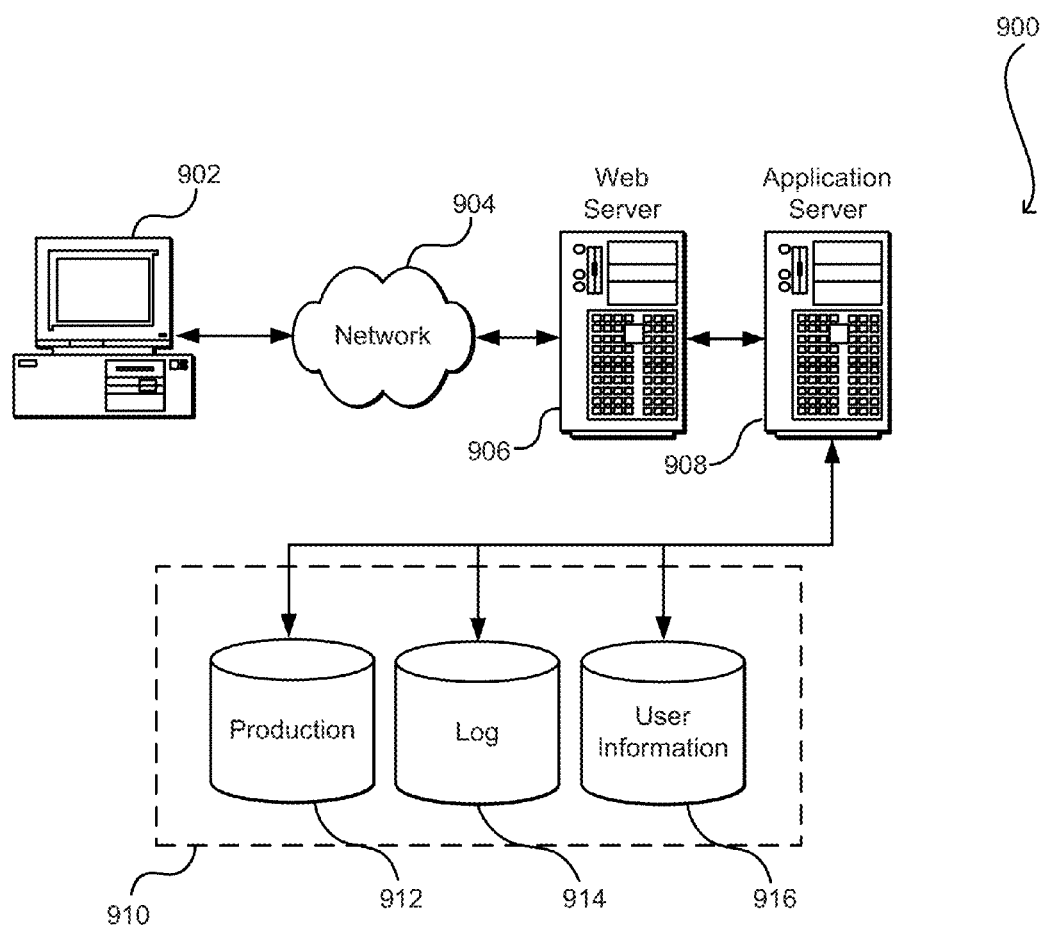
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    detecting, based at least in part on resource usage a computer system reaching a value relative to an overload threshold;
    producing a reconfigured computer system by reconfiguring the computer system to have receiving sufficient proof of work be a condition for servicing requests;
    receiving, at the reconfigured computer system, a request from a requestor to be serviced by the reconfigured computer system;
    identifying, at least in part from the request, a computational characteristic of a client device of the requestor;
    identifying, based at least in part on the resource usage and the computational characteristic, a work factor associated with a level of computational difficulty;
    identifying, based at least in part on the level of computational difficulty, a work-based challenge; that is designed to utilize more computational power to solve than to verify, without access to a correct solution to the work-based challenge, whether a proposed solution to the work-based challenge is correct;
    providing the work-based challenge to the requestor; and
    servicing the request based at least in part on a characteristic of a response to the work-based challenge.

2. The computer-implemented method of claim 1, wherein the method further comprises:
    detecting a change in system load caused, at least in part, by a denial of service attack; and
    reconfiguring, in accordance with the change detected in system load, the computer system to tune an amount of computational work required to generate proof of work by at least adjusting the work factor.

3. The computer-implemented method of claim 1, further comprising generating, based at least in part on the request, the work-based challenge.

4. The computer-implemented method of claim 1, wherein:
    completion of the work-based challenge requires use of secret information shared with the requestor prior to challenging the requestor to provide proof of work;
    the proposed solution lacks the secret information; and
    identifying whether the work-based challenge has been completed by the requestor correctly is further based at least in part on the secret information.

5. The computer-implemented method of claim 1, further comprising:
    generating the work-based challenge is further based at least in part on work needed for another purpose independent from servicing the request; and
    as a result of identifying that the work-based challenge has been completed by the requestor correctly:
        indicating in a data store that the work-based challenge has been completed; and
        persistently storing information that is based at least in part on the proposed solution.

6. The computer-implemented method of claim 1, wherein servicing the request is performed in accordance with a priority assigned to the request based at least in part on the level of computational difficulty.

7. The computer-implemented method of claim 1, wherein servicing the request based at least in part on the characteristic of the response includes servicing the request as a result of identifying, based at least in part on a characteristic data string included in a purported proof in the response from the requestor, that the work-based challenge has been completed successfully.

8. The computer-implemented method of claim 1, wherein the work-based challenge is further designed to utilize more computational power to complete than to service the request.

9. The computer-implemented method of claim 1, wherein the work-based challenge is further encoded as a script written in an industry standard scripting language.

10. The computer-implemented method of claim 9, wherein servicing the request includes providing content that includes another script of the industry standard scripting language.

11. A computer-implemented method, comprising:
    receiving a request from a requestor to be serviced by a computer system;
    detecting a condition associated with potential system overload of a resource of the computer system;
    identifying a work factor based at least in part on the condition and a computational characteristic of a client device of the requestor as determined at least in part from the request;
    generating a work-based challenge having a level of computational difficulty by at least applying a template to the work factor, the template associating the work factor with the level of computational difficulty, the work-based challenge requiring more computational power to solve than to verify, without access to a correct solution, that a proposed solution to the work-based challenge is correct;
    providing the work-based challenge to the requestor, the work-based challenge being executable by applications configured to submit requests to the computer system;
    receiving, from the requestor, purported proof of successful completion of the work-based challenge; and
    causing the request to be serviced as a result successful completion of the work-based challenge being verified based at least in part on the purported proof including a characteristic data string.

12. The computer-implemented method of claim 11, further comprising:
    detecting a change in the condition indicative of an absence of potential system overload; and
    as a result of detecting the change in the conditions, updating the work factor so as to remove a requirement to complete the work-based challenge for requests to be serviced.

13. The computer-implemented method of claim 11, wherein successful completion of the work-based challenge includes generating an output string that includes a specific substring.

14. The computer-implemented method of claim 11, wherein verification of successful completion of the work-based challenge requires identifying that the purported proof includes a specific substring.

15. The computer-implemented method of claim 11, wherein completion of the work-based challenge requires repeated invocation of a function until output of the function satisfies one or more conditions specified by the work-based challenge.

16. The computer-implemented method of claim 11, wherein the work-based challenge is encoded as a script executable by the requestor.

17. The computer-implemented method of claim 11, wherein sending the work-based challenge is performed as a result of detection of a denial of service attack.

18. The computer-implemented method of claim 11, wherein
sending the work-based challenge is performed as a result of identifying that the request has an elevated probability of being from a set of requests submitted to cause an overload condition.

19. The computer-implemented method of claim 11, wherein the request to be serviced is prioritized based at least in part on the level of computational difficulty.

20. The computer-implemented method of claim 11, wherein the level of computational difficulty is specified by the requestor via an input included in the request.

21. A system, comprising:
memory to store executable instructions that, if performed by one or more processors, cause the system to:
receive, from a client computer system, purported proof of a work-based challenge that is selected by the system from a plurality of generated work-based challenges based at least in part on application of a template to a work factor, the work factor being based at least in part on a level of resource utilization and a request submitted by the client computer system, the template associating the work factor to a level of computational difficulty for the work-based challenge, the level of computational difficulty being based at least in part on a computational characteristic of the client computer system as determined at least in part from the request;
verify, based at least in part on the purported proof including a characteristic data string, that the client computer system has successfully completed the work-based challenge, the work-based challenge requiring more computational power to solve than to verify, without access to a correct solution, that a proposed solution to the work-based challenge is correct; and
enable servicing of the request as a result of verifying that the client computer system has successfully completed the work-based challenge.

22. The system of claim 21, wherein:
the executable instructions further cause the system to send the work-based challenge to the client computer system in response to receipt of the request; and
the work-based challenge is natively executable by an application executed by the client computer system that submitted the request.

23. The system of claim 21, wherein the executable instructions further cause the system to vary difficulty of challenges for subsequent requests of other client computer systems.

24. The system of claim 21, wherein the executable instructions further cause the system to:
identify, from a set of challenges requiring completion, the work-based challenge; and
mark the work-based challenge as completed as a result of verifying that the client computer system has successfully completed the work-based challenge.

25. The system of claim 21, wherein successful completion of the work-based challenge includes generating a set of characters wherein the set of characters includes a particular subset or a particular plurality of subsets.

26. The system of claim 21, wherein the executable instructions further cause the system to, as a result of detection of conditions indicative of a denial of service attack,
send the work-based challenge to the client computer system.

27. The system of claim 21, wherein the executable instructions further cause the system to provide an application programming interface usable to configure how challenges are to be sent to requestors.

28. The system of claim 21, wherein the executable instructions further cause the system to send the work-based challenge as a result of detection of resource usage that indicates a potential system overload.

29. The system of claim 21, wherein:
the system is hosted by a computing resource provider; and
the executable instructions further cause the system to send, from a load balancer hosted by the computing resource provider and operated as a service to a customer of the computing resource provider, the work-based challenge to the client computer system in response to receipt of the request.

30. A non-transitory computer-readable storage medium to store executable instructions that, if performed by one or more processors of a computer system, cause the computer system to:
generate a plurality of work-based challenges, each challenge in the plurality:
having a level of computational difficulty;
generated by at least applying a template to a work factor, the template associating the work factor with a level of computational difficulty, the work factor:
being based at least in part on a level of resource utilization and a request from a client device; and
requiring more computational power to solve than to verify, without access to a correct solution, that a proposed solution to the challenge is correct;
receive the request from the client device;
select, based at least in part on a computational characteristic of the client device as determined at least in part from the request, a work-based challenge from the plurality of work-based challenges;
receive, from the client device, purported proof of completion of the work-based challenge; and
enable the request to be serviced as a result of the work-based challenge being verified, based at least in part on the purported proof including a characteristic data string, as having been completed correctly.

31. The non-transitory computer-readable storage medium of claim 30, wherein the work-based challenge is encoded as a browser-executable script.

32. The non-transitory computer-readable storage medium of claim 30, wherein:
the request is a request for content; and
the work-based challenge is configured such that an application with an ability to process the content is also able to complete the work-based challenge.

33. The non-transitory computer-readable storage medium of claim 30, wherein the executable instructions cause the computer system to identify a difficulty level of the work-based challenge based at least in part on network load.

34. The non-transitory computer-readable storage medium of claim 30, wherein the work-based challenge is generated at least in part by using at least a portion of the request to generate information to be processed to complete the work-based challenge.

35. The non-transitory computer-readable storage medium of claim 30, wherein:
- the computer system provides a service to requestors for a fee; and
- an amount of the fee for a particular requestor is based at least in part on an amount of work done by the requestor.

* * * * *